ns Patent Office 2,950,283
Patented Aug. 23, 1960

2,950,283

RECOVERY OF THE SULFONATION PRODUCTS OF QUINOLINE

Louis L. Zempliner, 276 Riverside Drive, New York, N.Y.

No Drawing. Filed May 26, 1958, Ser. No. 737,499

4 Claims. (Cl. 260—283)

This provision provides an improved process for the isolation and recovery of the sulfonation products of quinoline, including unreacted quinoline and excess sulfuric acid.

Quinoline is sulfonated by reacting it with an excess of sulfuric acid containing free $SO_3$ (oleum) at temperatures ranging from 90 to 180° C. Depending upon the conditions of the reaction, the products are quinoline 8-sulfonic acid, quinoline 5-sulfonic acid and quinoline 6-sulfonic acid, together with unreacted quinoline and excess acid. Ordinarily the reaction mass is poured into 4 to 10 volumes of water and allowed to cool, whereupon the sparingly soluble quinoline 8-sulfonic acid crystallizes out and is recovered by filtration or centrifuging. Yields of this product range from 40 to 60% of the quinoline used as the starting material. The filtrate contains 10 to 15% of sulfuric acid and 40 to 60% of the quinoline in the form of the soluble 5- and 6-sulfonic acids and quinoline acid sulfate. Because procedures for the recovery of these soluble acids and quinoline, such as precipitation by lime, removal of calcium sulfate, concentration, treatment with soda ash, etc., or distillation procedures, have not been feasible from an economic standpoint, this aqueous acid filtrate is customarily discarded and represents a substantial economic loss.

The present invention is based upon the discovery that sulfuric acid-stable ketones, esters and ethers, if soluble in concentrated sulfuric acid, when used in a volume somewhat greater than that of the reaction mass, upon admixture with the reaction mass, precipitate the sulfonic acids and the unreacted quinoline as the acid sulfate almost quantitatively in crystalline form. Advantageously, from 3 to 5 volumes of solvent are used for each volume of reaction mass. The precipitated crystalline materials are filtered off and further processed for recovery of the components by relatively simple procedures because of the absence of excess sulfuric acid. Treatment of the remaining liquid phase with water brings about separation of the sulfuric acid and the solvent which can then be reused in the procedure, the aqueous phase containing practically all of the sulfuric acid present in the reaction mass. This acid can be recovered, as for example by conversion to quinoline acid sulfate, for reuse in the process or discarded.

The precipitated mixture of sulfonic acids and quinoline acid sulfate is readily worked up for the separation of the quinoline 8-sulfonic acid. Thus it may be dissolved in about three times its weight of hot water and the resulting solution allowed to cool. The quinoline 8-sulfonic acid crystallizes out and can be separated by filtration or the like, while the mother liquor is evaporated on the waterbath giving a product containing all of the residual quinoline in the form of 5- and 6-sulfonic acids and quinoline acid sulfate. This mixture is well suited for the production of nicotinic acid, as for example by oxidation with sulfuric and nitric acids or by air in sulfuric acid solution with or without catalysts. Such oxidation procedures are well known.

Organic solvents which are advantageously used in the practice of the present invention are the liquid ketones containing more than 4 carbon atoms, including methyl isobutyl ketone, methyl isopropyl ketone, diisobutyl ketone, methyl-n-amyl ketone, cyclohexanone and acetophenone. Acetone and methyl-ethyl ketone are not suitable for use because they are decomposed by the sulfuric acid.

Useful ethers include di-isopropyl ether, n-dibutyl ether, anisol, tetrahydrofurane and ethylene glycol di-n-butyl ether. Dimethyl ether and diethyl ether are too sensitive to sulfuric acid to be useful, while dioxane forms a solid addition compound. Useful esters include methyl acetate, ethyl acetate, isopropyl acetate, n-butyl acetate, ethyl benzoate and other liquid carboxylic acid esters.

These oxygen-containing solvents may be used singly or in combination. It appears to be important to choose a solvent which forms a soluble oxonium compound with sulfuric acid under the substantially anhydrous conditions used in mixing the solvent with the reaction mass. It is also desirable to use a solvent of low viscosity, low vapor pressure, low specific gravity and low solubility in water as such solvents are more easily recovered for reuse in the process after the sulfonic acids and quinoline have been removed and water has been added to bring about separation of the sulfuric acid and solvent.

While I do not wish to be bound by any theory as to the mechanism involved in the separation operation of the present invention, I believe that the ether, ester or ketone forms with the sulfuric acid an oxonium compound, that in the case of the solvents used in the practice of the invention, the value of the Van't Hoff factor "$i$" is close to 2 and the precipitation of the sulfonic acids and the quinoline acid sulfate results from the formation of ionized oxonium compounds between the sulfuric acid and the solvent. After separation of the precipitated materials, the solvent is recovered by treatment of the oxonium compound solution with water, with decomposition of the oxonium compound and regeneration of the free solvent which is insoluble in the diluted sulfuric acid.

The invention will be illustrated by the following examples, but it is not limited thereto:

EXAMPLE 1

129 grams (1 mole) quinoline is sulfonated with 516 grams 20% oleum at 150° C. for 4 hours. The sulfonation mass is allowed to cool to room temperature. It is then treated with 2 liters of commercial methyl isobutyl ketone. The mass is stirred vigorously but without aeration: the temperature rises to 50° C. and by external cooling is kept below this point. The initially pasty mass becomes gradually granular and crystalline, while the liquid phase assumes the characteristic red color of the protonated ketone. Stirring is continued finally at room temperature for one hour. The crystals are then filtered off or centrifuged. The well pressed filter cake, weighing 340 grams, is somewhat hygroscopic and contains practically all of the sulfonation products in the form of quinoline sulfonic acids plus quinoline acid sulfate, together with some free sulfuric acid and adhering solvent.

By slurrying this press cake repeatedly in fresh methyl isobutyl ketone, it is possible to free it from most of the adhering sulfuric acid, however, for the purposes of this procedure this is not necessary, since neither moisture nor the free sulfuric acid interferes with successive recovery of the quinoline sulfonation products. The cake is, therefore, immediately treated, preferably in a flask with a condenser attachment, with 1.2 liters of water and heated to 100° C. Methyl isobutyl ketone water azeotrope distills off and is collected. About 65 cc. of the ketone (52 grams) is thus recovered. The rest of the cake is completely dissolved and left to cool, The sparingly soluble quinoline 8-sulfonic acid crystallizes out from the solution, and is filtered off, washed with cold water and dried at 110° C. Yield 129 grams (58.6%) of very pure quinoline 8-sulfonic acid. The aqueous mother liquor is concentrated by evaporation in an open pan on the steam bath or by exhaust steam, to constant weight. Final weight of the concentrate depends upon the temperature; in this particular case, keeping the contents of the pan at not higher than 110° C., there is finally obtained a semi-crystalline slurry weighing 148.2 grams the composition of which is reported in the following Table 1:

Table 1

RECOVERY OF QUINOLINE SULFONATION PRODUCTS

[Quinoline sulfonated: 1 mole=100%.]

|  | Recovered, Grams | Mole Percent of Quinoline |
|---|---|---|
| Quinoline 8-Sulfonic Acid | 129 | 58.60 |
| Concentrate of Mother Liquor: |  |  |
| Quinoline Acid Sulfate | 50.7 | 22.15 |
| Mixed Sulfonic Acids, other than 8- | 30.5 | 14.60 |
| Free Sulfuric Acid | 42 |  |
| Water | 25 |  |
| Total Weight of Concentrate | 148.2 | 95.35 |

Thus 95.35% of the initially introduced quinoline has been recoverd, including 36.75% not isolated as quinoline 8-sulfonic acid and which formerly was discarded.

This concentrated mother liquor composed as per Table 1 is immediately available, if desired, for conversion into nicotinic acid by any of the known procedures using high temperature oxidation with sulfuric and nitric acids, or by air in sulfuric acid solution, with or without catalysts. For this purpose, I prefer to add an equivalent quantity of $SO_3$ to the water present in the concentrate (1.4 moles=112 grams $SO_3$ in this case) and regard the resulting mass as containing 0.3675 mole of quinoline and 179 grams of sulfuric acid. A conversion to nicotinic acid is attained by known processes in 65 to 75% yield.

The filtrate of methyl isobutyl ketone and sulfuric acid, as above described, and measuring 1975 cc., contains, by analysis 376 grams of sulfuric acid. It is treated successively with 500 and 300 cc. of water in a separatory funnel. The lower aqueous phases are separated. They contain 372 grams $H_2SO_4$. The upper ketone layer, containing a residual trace of acid and about 2% water, can be used, without further treatment, for the next sulfonation batch.

EXAMPLE 2

This example illustrates the method by which excess sulfuric acid used in the sulfonation may be recovered. The above described filtrate of methyl isobutyl ketone—$H_2SO_4$ oxonium compound is treated with slightly less than the equivalent amount of quinoline. In the above described case, the oxonium-filtrate contained 376 grams equal to about 3.83 moles of sulfuric acid. To this filtrate is gradually added, under stirring and outside cooling, 3.8 moles or 490 grams of quinoline (100% base). The crystalline precipitate is stirred at room temperature for 1 hour and the crystals are centrifuged or filtered off. The well pressed cake is dried, preferably under slight vacuum and there is recovered 860 grams of crystalline quinoline acid sulfate, M.P. 163–4° C. (99.8% yield). The ketone filtrate, containing a trace of residual sulfuric acid, may be immediately reused for the next batch, while the dried quinoline acid sulfate can be sulfonated, using 1 mole less of sulfuric acid for every mole of quinoline.

EXAMPLE 3

The procedure of Example 1 is repeated except that 1500 cc. of ethylene glycol dibutyl ether (Dibutyl Cellosolve) are used. The initially almost homogeneous mass is stirred for one hour and the precipitated crystals filtered off. The well pressed crystal cake is then slurried with 300 cc. of acetone and again filtered. There is obtained a cake weighing 235 grams. 128 grams of quinoline 8-sulfonic acid are obtained by crystallization from water, using the method outline in Example 1. The resulting aqueous filtrate is concentrated by evaporation giving a final concentrate in the form of a crystalline slurry weighing 117 grams. This analyzed to contain:

|  | Grams |
|---|---|
| Quinoline acid sulfate | 47.2 |
| Mixed sulfonic acids, other than 8- | 34.6 |
| Free sulfuric acid | 10.2 |
| Water | 25 | or a total recovery of 96.1% of the quinoline.

The Dibutyl Cellosolve-oxonium filtrate and the separately kept acetone-Dibutyl Cellosolve filtrate are worked up as previously outlined: the acetone-Dibutyl Cellosolve is preferably recovered by neutralizing the free sulfuric acid with quinoline, as described in Example 2.

EXAMPLE 4

The procedure of Example 1 is followed except that 2 liters of n-butyl acetate are used and the temperature of the mass is kept below 10° C. during the stirring and separating operations. There is recovered 129 grams of quinoline 8-sulfonic acid and a final concentrate of 138.5 grams containing 29.3 grams of quinoline acid sulfate and 33.1 grams of mixed sulfonic acids (other than 8), the rest being sulfuric acid and water. Total recovery is 88.3% of the quinoline.

Similar results are obtained with other solvents such as di-n-butyl ether, di-isobutyl ketone, methyl-n-amyl ketone, and other ethers, esters and ketones which form oxonium compounds with concentrated sulfuric acid having Van't Hoff factors approximating 2.

I claim:

1. The process of recovering the products of sulfonation of quinoline from mixtures of such products with sulfuric acid, said products being selected from the group consisting of quinoline sulfonic acids, quinoline acid sulfate, and quinoline, the step comprising admixing such a mixture with at least its volume of a liquid, sulfuric acid stable oxygenated organic solvent selected from the group consisting of (a) ketones selected from the group consisting of acetophenone, and dialkyl and cycloalkyl alkyl ketones having only one carbonyl group and from 4 to 9 carbon atoms, (b) esters of up to 9 carbon atoms of the group consisting of ethyl benzoate and acetates of alkanols, and (c) ethers selected from the group consisting of dialkyl ethers, said ethers having more than 4 and up to 8 carbon atoms, tetrahydrofurane, anisole and the lower alkyl diether compounds of ethylene glycol and diethylene glycol; said compounds being composed solely of carbon, hydrogen and oxygen.

2. The process of recovering excess sulfuric acid used in the sulfonation of quinoline which includes admixing the reaction product of quinoline and oleum with at least its volume of a liquid, sulfuric acid stable oxygenated organic solvent selected from the group consisting of (a) ketones selected from the group consisting of acetophenone, and dialkyl and cycloalkyl alkyl ketones having only one carbonyl group and from 4 to 9 carbon atoms, (b) esters of up to 9 carbon atoms of the group consisting of ethyl benzoate and acetates of alkanols, and (c) ethers selected from the group consisting of dialkyl ethers, said ethers having more than 4 and up to 8 carbon atoms, tetrahydrofurane, anisole and the lower alkyl diether compounds of ethylene glycol and diethylene glycol; said compounds being composed solely of carbon, hydrogen and oxygen; removing the precipitate; adding quinoline and recovering the resulting quinoline acid sulfate.

3. The process for recovering quinoline 8-sulfonic acid from the products of sulfonation of quinoline from mixtures of such products with sulfuric acid which includes admixing such a mixture with at least its volume of a liquid, sulfuric acid stable oxygenated organic solvent selected from the group consisting of (a) ketones selected from the group consisting of acetophenone, and dialkyl and cycloalkyl alkyl ketones having only one carbonyl group and from 4 to 9 carbon atoms, (b) esters of up to 9 carbon atoms of the group consisting of ethyl benzoate and acetates of alkanols, and (c) ethers selected from the group consisting of dialkyl ethers, said ethers having more than 4 and up to 8 carbon atoms, tetrahydrofurane, anisole and the lower alkyl diether compounds of ethylene glycol and diethylene glycol; said compounds being composed solely of carbon, hydrogen and oxygen; recovering the precipitate; dissolving the precipitate in hot water; and cooling the solution to crystallize out quinoline 8-sulfonic acid; and recovering the quinoline 8-sulfonic acid.

4. The process for recovering a mixture of quinoline 5 sulfonic acid, quinoline 6-sulfonic acid and quinoline acid sulfate from the products of sulfonation of quinoline from mixtures of such products with sulfuric acid which includes admixing such a mixture with at least its volume of a liquid, sulfuric acid stable oxygenated organic solvent selected from the group consisting of (a) ketones selected from the group consisting of acetophenone, and dialkyl and cycloalkyl ketones having only one carbonyl group and from 4 to 9 carbon atoms, (b) esters of up to 9 carbon atoms of the group consisting of ethyl benzoate and acetates of alkanols, and (c) ethers selected from the group consisting of dialkyl ethers, said ethers having more than 4 and up to 8 carbon atoms, tetrahydrofurane, anisole and the lower alkyl diether compounds of ethylene glycol and diethylene glycol; said compounds being composed solely of carbon, hydrogen and oxygen; removing the precipitate; dissolving the precipitate in hot water and cooling the solution to form crystals and a mother liquor; and recovering the mother liquor including a mixture of quinoline 5-sulfonic acid, quinoline 6-sulfonic acid and quinoline acid sulfate.

References Cited in the file of this patent
UNITED STATES PATENTS

| | | |
|---|---|---|
| 2,083,856 | Moravec et al. | June 15, 1937 |
| 2,359,737 | Lacey et al. | Oct. 10, 1944 |

OTHER REFERENCES

McCasland: J. Org. Chem., vol. 11, pp. 277–280 (1946).

Claus et al.: Journale für Praktische Chemie, vol. 48 (2), pp. 265–266.

Claus et al.: Journale für Prakt. Chemie, vol. 40 (2), pp. 451–453.

Beilstein: Handbuch der Org. Chem., vol. 22 (1935), pp. 391–394.

UNITED STATES PATENT OFFICE
CERTIFICATE OF CORRECTION

Patent No. 2,950,283                          August 23, 1960

Louis L. Zempliner

It is hereby certified that error appears in the printed specification of the above numbered patent requiring correction and that the said Letters Patent should read as corrected below.

Column 1, line 15, for "provision" read -- invention --; column 2, line 32, and column 4, line 38, for "Van't Hoff" each occurrence, read -- van t'Hoff --; column 6, line 1, after "cycloalkyl" insert -- alkyl --.

Signed and sealed this 4th day of April 1961.

(SEAL)
Attest: ERNEST W. SWIDER

Attesting Officer

ARTHUR W. CROCKER
Acting Commissioner of Patents